United States Patent
Zhang (10) Patent No.: US 10,760,907 B2
(45) Date of Patent: Sep. 1, 2020

(54) SYSTEM AND METHOD FOR MEASURING A DISPLACEMENT OF A MOBILE PLATFORM

(71) Applicant: SZ DJI TECHNOLOGY CO., LTD., Shenzhen (CN)

(72) Inventor: Honghui Zhang, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 16/733,550

(22) Filed: Jan. 3, 2020

(65) Prior Publication Data
US 2020/0149887 A1  May 14, 2020

Related U.S. Application Data

(63) Continuation of application No. 15/844,341, filed on Dec. 15, 2017, now Pat. No. 10,527,416, which is a
(Continued)

(51) Int. Cl.
*H04N 7/18* (2006.01)
*G01C 11/06* (2006.01)
(Continued)

(52) U.S. Cl.
CPC ............ *G01C 11/06* (2013.01); *G01C 11/08* (2013.01); *G01C 21/005* (2013.01); *G06T 7/246* (2017.01);
(Continued)

(58) Field of Classification Search
CPC ...... G01C 11/06; G01C 21/005; G01C 11/08; G06T 7/285; G06T 7/246; G06T 7/97;
(Continued)

(56) References Cited

U.S. PATENT DOCUMENTS 9,070,289 B2  6/2015 Saund et al.
9,229,540 B2  1/2016 Mandella et al.
(Continued)

FOREIGN PATENT DOCUMENTS

CN    1670479 A    9/2005
CN  101876535 A   11/2010
(Continued)

OTHER PUBLICATIONS

Han et al, Dynamic modeling based flight PD controller applied to an unmanned hexarotor helicopter (Year: 2015).*
(Continued)

*Primary Examiner* — Shan E Elahi
(74) *Attorney, Agent, or Firm* — Anova Law Group, PLLC (57) ABSTRACT

A method for detecting a displacement of a mobile platform is provided. The method includes acquiring a first frame and a second frame using an imaging device that is coupled to the mobile platform, and obtaining rotation data using an inertial measurement unit (IMU) that is coupled to the mobile platform. The method also includes calculating a translation array based on the first frame, the second frame, and the rotation data. The method further includes determining the displacement of the mobile platform based on the translation array.

26 Claims, 8 Drawing Sheets

Related U.S. Application Data continuation of application No. PCT/CN2015/082525, filed on Jun. 26, 2015.

(51) Int. Cl.

| | | |
|---|---|---|
| *G06T 7/246* | (2017.01) | |
| *G01C 11/08* | (2006.01) | |
| *G06T 7/285* | (2017.01) | |
| *G01C 21/00* | (2006.01) | |
| *G06T 7/00* | (2017.01) | |

(52) U.S. Cl.
CPC .............. *G06T 7/285* (2017.01); *G06T 7/97* (2017.01); *G06T 2207/10021* (2013.01); *G06T 2207/10028* (2013.01); *G06T 2207/10032* (2013.01)

(58) Field of Classification Search
CPC . G06T 2207/10028; G06T 2207/10032; G06T 2207/10021
USPC ........................................................ 348/135
See application file for complete search history.

(56) References Cited

U.S. PATENT DOCUMENTS

| | | | |
|---|---|---|---|
| 9,689,976 B2 | 6/2017 | Parker et al. | |
| 9,758,239 B2 | 9/2017 | Metzler et al. | |
| 9,830,503 B1 | 11/2017 | Martin et al. | |
| 10,055,647 B2 | 8/2018 | Beckhaus et al. | |
| 10,112,715 B2 | 10/2018 | Whitmarsh et al. | |
| 10,220,953 B2 | 3/2019 | Ishii et al. | |
| 2008/0195316 A1 | 8/2008 | Krishnaswamy | |
| 2009/0125223 A1 | 5/2009 | Higgins | |
| 2009/0187299 A1 | 7/2009 | Fregene et al. | |
| 2010/0092079 A1 | 4/2010 | Aller | |
| 2011/0181689 A1 | 7/2011 | Kweon | |
| 2013/0002866 A1* | 1/2013 | Hampapur | G06T 7/254 348/143 |
| 2013/0022233 A1 | 1/2013 | Ma | |
| 2013/0259304 A1 | 10/2013 | Aller | |
| 2015/0178584 A1* | 6/2015 | Aller | G06K 9/62 382/165 |
| 2016/0165190 A1 | 6/2016 | Beckhaus | |
| 2017/0158342 A1 | 6/2017 | Ishii | |
| 2017/0293796 A1 | 10/2017 | Li et al. | |
| 2018/0265192 A1 | 9/2018 | Yamagami et al. | |
| 2019/0003807 A1 | 1/2019 | Whitmarsh | |
| 2019/0176967 A1 | 6/2019 | Ohata et al. | |

FOREIGN PATENT DOCUMENTS

| | | |
|---|---|---|
| CN | 104364796 A | 2/2015 |
| EP | 2549288 A1 | 1/2013 |
| JP | 2001039397 A | 2/2001 |
| JP | 2002048513 A | 2/2002 |
| JP | 2011511736 A | 4/2011 |
| JP | 2013246111 A | 12/2013 |
| JP | 2014089160 A | 5/2014 |
| WO | 2013062557 A1 | 5/2013 |
| WO | 2013178407 A1 | 12/2013 |

OTHER PUBLICATIONS

The World Intellectual Property Organization (WIPO) International Search Report and Written Opinion for PCT/CN2015/082525 dated Mar. 24, 2016 8 Pages.

Gianpaolo Conte and Patrick Doherty, An Integrated UAV Navigation System Based on Aerial Image Matching, 2008 IEEE Aerospace Conference, Mar. 1, 2008, pp. 1-10, copy provided by European Patent Office labeled XP031256426.

Girish Chowdhary et al., GPS-Denied Indoor and Outdoor Monocular Vision Aided Navigation and Control of Unmanned Aircraft, Journal of Field Robotics, May 1, 2013, 45 pages, copy provided by European Patent Office labeled XP055379077.

Chunhui Zhao et al., Visual Odometry and Scene Matching Integrated Navigation System in UAV, 17th International Conference on Information Fusion (Fusion), International Society of Information Fusion, Jul. 7, 2014, 6 pages, copy provided by European Patent Office labeled XP032653926.

Wang, et al, Complete pose determination for low altitude unmanned aerial vehicle using stereo vision (Year: 2005).

Santos, et al., Estimating and controlling UAV position using RGB-D/IMU data fusion with decentralized information/kalman filter (Year: 2015).

* cited by examiner

SYSTEM AND METHOD FOR MEASURING A DISPLACEMENT OF A MOBILE PLATFORM

CROSS-REFERENCE TO RELATED APPLICATIONS

This application is a continuation of application Ser. No. 15/844,341, filed on Dec. 15, 2017, which is a continuation of International Application No. PCT/CN2015/082525, filed on Jun. 26, 2015, the entire contents of both of which are incorporated herein by reference.

FIELD

The disclosed embodiments relate generally to mobile platform operations and more particularly, but not exclusively, to systems and methods for detecting a displacement of a mobile platform.

BACKGROUND

Determination of a displacement of an Unmanned Aerial Vehicles ("UAVs") is constantly needed for navigating and operating the UAVs. Currently-available technologies for measuring the displacement can only ensure performance and precision under certain conditions, such as within a certain height range. Moreover, the currently-available technologies are vulnerable to ambient interferences.

Among the currently-available technologies, a solution based on a monocular imaging device and an ultrasonic device can be limited by a detective distance of the ultrasonic device, therefore, normally only applicable within a low altitude of half meter to five meters. In addition, such monocular solution can also be vulnerable to noises existing in an ambient setting. An alternative solution that is based upon a binocular imaging device is limited by a length of a baseline between two lenses of the binocular imaging device and are only applicable within an altitude of one to ten meters. Another solution based on a Global Positioning Device ("GPS") is not reliable under an indoor setting or under a complex ambient setting because of lack of reliable signal.

In view of the foregoing reasons, there is a need for a system and method for effectively and efficiently measuring the displacement of the mobile platform in wide range of heights.

SUMMARY

In accordance with another aspect disclosed herein, there is set forth a method for detecting displacement of a mobile platform, comprising:

obtaining a first frame and a second frame with an imaging device; and determining the displacement of the mobile platform based upon the first frame and the second frame.

In an exemplary embodiment of the disclosed methods, obtaining comprises acquiring a height of the mobile platform.

In an exemplary embodiment of the disclosed methods, acquiring the height comprises acquiring the height via at least one of a barometer and an ultrasonic device.

In an exemplary embodiment of the disclosed methods, obtaining comprises acquiring an angle of the imaging device with respect to a ground level.

In an exemplary embodiment of the disclosed methods, acquiring the angle comprises acquiring the angle via an Inertial Measurement Unit ("IMU").

In an exemplary embodiment of the disclosed methods, obtaining further comprises measuring a rotation angle of the mobile platform with the IMU relative to the first frame to generate rotation data.

In an exemplary embodiment of the disclosed methods, obtaining further comprises matching the first and second frames, wherein the first frame overlaps with the second frame by a predetermined percentage.

In an exemplary embodiment of the disclosed methods, obtaining comprises acquiring the first frame and the second frame at different time points.

In an exemplary embodiment of the disclosed methods, acquiring the first frame and the second frame at different time points comprises acquiring the first frame and the second frame at an interval not less than one-sixtieth of a second and not greater than one-twentieth of a second.

Exemplary embodiments of the disclosed methods further comprise acquiring a stereoscopic point cloud based on at least one of the first frame, the height of the mobile platform and the angle of the mobile platform, wherein the stereoscopic point cloud is an array of feature points $\{P1, P2, P3, \ldots, Pn\}$.

Exemplary embodiments of the disclosed methods further comprise acquiring a second projective array in an x-y plane $\{(x_1^2, y_1^2), (x_2^2, y_2^2), (x_3^2, y_3^2), \ldots, (x_m^2, y_m^2)\}$ based on the stereoscopic point cloud.

In an exemplary embodiment of the disclosed methods, acquiring the second projective array comprises:

acquiring a first projective array in an x-y plane $\{(x_1^1, y_1^1), (x_2^1, y_2^1), (x_3^1, y_3^1), \ldots, (x_n^1, y_n^1)\}$ based on the stereoscopic point cloud; and matching a plurality of feature points of the first projective array onto the second frame to generate the second projective array $\{(x_1^2, y_1^2), (x_2^2, y_2^2), (x_3^2, y_3^2), \ldots, (x_m^2, y_m^2)\}$.

In an exemplary embodiment of the disclosed methods, matching the plurality of feature points comprises:

scanning the second frame to identify a point of the second frame that matches a selected feature point of the first frame; and calculating a similarity between the selected feature point of the first frame and the point.

In an exemplary embodiment of the disclosed methods, calculating the similarity comprises comparing the selected feature point of the first frame with a three-by-three pixel area centered around the point on the second frame.

In an exemplary embodiment of the disclosed methods, comparing a three-by-three pixel area comprises comparing a sum of differences for each color component of each pixel of color images or a sum of differences of grayscale values of each pixel of black and white images.

Exemplary embodiments of the disclosed methods further comprise calculating a translation array T based on the rotation data, the stereoscopic point cloud and the second projective array.

In an exemplary embodiment of the disclosed methods, calculating the translation array T comprises applying a relation:

$$RP_j + T = \mu \begin{pmatrix} x_j^2 \\ y_j^2 \\ 1 \end{pmatrix}$$

wherein R is an array of rotation measurements, Pj is a point, T represents a translation array to be calculated and μ is a random number.

In an exemplary embodiment of the disclosed methods, applying $$RP_j + T = \mu \begin{pmatrix} x_j^2 \\ y_j^2 \\ 1 \end{pmatrix}$$

further comprises calculating T by solving a set of equations for at least two points selected from the stereoscopic point cloud and their matching two points of the second projective array.

Exemplary embodiments of the disclosed methods further comprise verifying the translation array T by introducing T into equation $$RP_j + T = \mu \begin{pmatrix} x_j^2 \\ y_j^2 \\ 1 \end{pmatrix}$$

with a plurality of points selected from the stereoscopic point cloud and their corresponding projection points of the second projective array to get a count of matching points; and selecting a translation array T with maximum count of matching points as a selected translation array T.

Exemplary embodiments of the disclosed methods further comprise calculating a stereoscopic point cloud for the second frame with the rotation data, the selected translation T and the relation $$RP_j + T = \mu \begin{pmatrix} x_j^2 \\ y_j^2 \\ 1 \end{pmatrix}.$$

Exemplary embodiments of the disclosed methods further comprise calculating the displacement of the mobile platform based upon the selected translation array T.

Exemplary embodiments of the disclosed methods further comprise calculating a velocity of the mobile platform based upon the selected translation array T and the interval between the time points for acquiring the first and the second frames.

Exemplary embodiments of the disclosed methods further comprise calculating a location of the mobile platform based upon the selected translation array T and location information of the mobile platform at a time point for acquiring the first frame.

In accordance with another aspect disclosed herein, there is set forth an apparatus for detecting displacement of a mobile platform, comprising:

an imaging device for obtaining a first frame and a second frame; and a processor for determining the displacement of the mobile platform based upon the first frame and the second frame.

In an exemplary embodiment of the disclosed apparatuses, the processor is configured to acquire a height of the mobile platform.

In another exemplary embodiment of the disclosed apparatuses, the height is provided via at least one of a barometer and an ultrasonic device.

In another exemplary embodiment of the disclosed apparatuses, the processor is configured to acquire an angle of the imaging device with respect to a ground level.

In another exemplary embodiment of the disclosed apparatuses, the angle of the mobile platform is acquired via an Inertial Measurement Unit ("IMU").

In another exemplary embodiment of the disclosed apparatuses, the processor is configured to measure a rotation angle of the mobile platform with the IMU relative to the first frame to generate rotation data.

In another exemplary embodiment of the disclosed apparatuses, the processor is configured to match the first and second frames, wherein the first frame overlaps with the second frame by a predetermined percentage.

In another exemplary embodiment of the disclosed apparatuses, the first frame and the second frame are acquired at different time points.

In another exemplary embodiment of the disclosed apparatuses, the different time points comprise an interval between the time points of not less than one-sixtieth of a second and not greater than one-twentieth of a second.

In another exemplary embodiment of the disclosed apparatuses, the processor is configured to acquire a stereoscopic point cloud based on at least one of the first frame, the height of the mobile platform and the angle of the mobile platform, wherein the stereoscopic point cloud is an array of feature points $\{P1, P2, P3, \ldots, Pn\}$.

In another exemplary embodiment of the disclosed apparatuses, the processor is configured to acquire a second projective array in an x-y plane $\{(x_1^2, y_1^2), (x_2^2, y_2^2), (x_3^2, y_3^2), \ldots, (x_m^2, y_m^2)\}$ based on the stereoscopic point cloud.

In another exemplary embodiment of the disclosed apparatuses, the processor is configured to acquire a first projective array in an x-y plane $\{(x_1^1, y_1^1), (x_2^1, y_2^1), (x_3^1, y_3^1), \ldots, (x_n^1, y_n^1)\}$ based on the stereoscopic point cloud; and wherein the processor is configured to match a plurality of feature points of the first projective array onto the second frame to generate the second projective array $\{(x_1^2, y_1^2), (x_2^2, y_2^2), (x_3^2, y_3^2), \ldots, (x_m^2, y_m^2)\}$.

In another exemplary embodiment of the disclosed apparatuses, the processor is configured to match the plurality of feature points by scanning the second frame to identify a point of the second frame that matches a selected feature point of the first frame and calculating a similarity between the selected feature point of the first frame and the point.

In another exemplary embodiment of the disclosed apparatuses, the processor is configured to calculate the similarity by comparing the selected feature point of the first frame with a three-by-three pixel area centered around the point on the second frame.

In another exemplary embodiment of the disclosed apparatuses, the three-by-three pixel areas of the first frame and the second frame are compared with a sum of differences for each color component of each pixel of color images or a sum of differences of grayscale values of each pixel of black and white images.

In another exemplary embodiment of the disclosed apparatuses, the processor is configured to calculate a translation array T based on the rotation data, the stereoscopic point cloud and the second projective array.

In another exemplary embodiment of the disclosed apparatuses, the translation array T is calculated by applying a relation:

$$RP_j + T = \mu \begin{pmatrix} x_j^2 \\ y_j^2 \\ 1 \end{pmatrix}$$

wherein R is an array of rotation measurements, Pj is a point, T represents a translation array to be calculated and μ is a random number.

In another exemplary embodiment of the disclosed apparatuses, the processor is configured to calculate the translation array T by solving a set of equations for at least two points selected from the stereoscopic point cloud and their matching two points of the second projective array.

In another exemplary embodiment of the disclosed apparatuses, the processor is configured to verify the translation array T by introducing T into equation $$RP_j + T = \mu \begin{pmatrix} x_j^2 \\ y_j^2 \\ 1 \end{pmatrix}$$

with a plurality of points selected from the stereoscopic point cloud and their corresponding projection points of the second projective array to get a count of matching points; and wherein the processor is configured to select the translation array T with maximum count of matching points as a selected translation array T.

In another exemplary embodiment of the disclosed apparatuses, the processor is configured to calculate the displacement of the mobile platform based upon the selected translation array T.

In another exemplary embodiment of the disclosed apparatuses, the processor is configured to calculate a velocity of the mobile platform based upon the selected translation array T and the interval between the two time points for acquiring the first and the second stereoscopic frames.

In another exemplary embodiment of the disclosed apparatuses, the processor is configured to calculate a location of the mobile platform based upon the selected translation array T and location information of the mobile platform at a time point for acquiring the first stereoscopic frame.

It should be noted that the figures are not drawn to scale and that elements of similar structures or functions are generally represented by like reference numerals for illustrative purposes throughout the figures. It also should be noted that the figures are only intended to facilitate the description of the embodiments. The figures do not illustrate every aspect of the described embodiments and do not limit the scope of the present disclosure.

DETAILED DESCRIPTION OF THE EMBODIMENTS

Since currently-available vision systems are restricted by conditions, a mobile platform and method that can meet the requirements of measuring a displacement of the mobile platform during a flight course at various heights under various conditions can prove desirable and provide a basis for accurate measurement of displacements, for systems such as UAV systems and other mobile platforms. This result can be achieved, according to one embodiment disclosed in FIG. 1.

Figure 1:
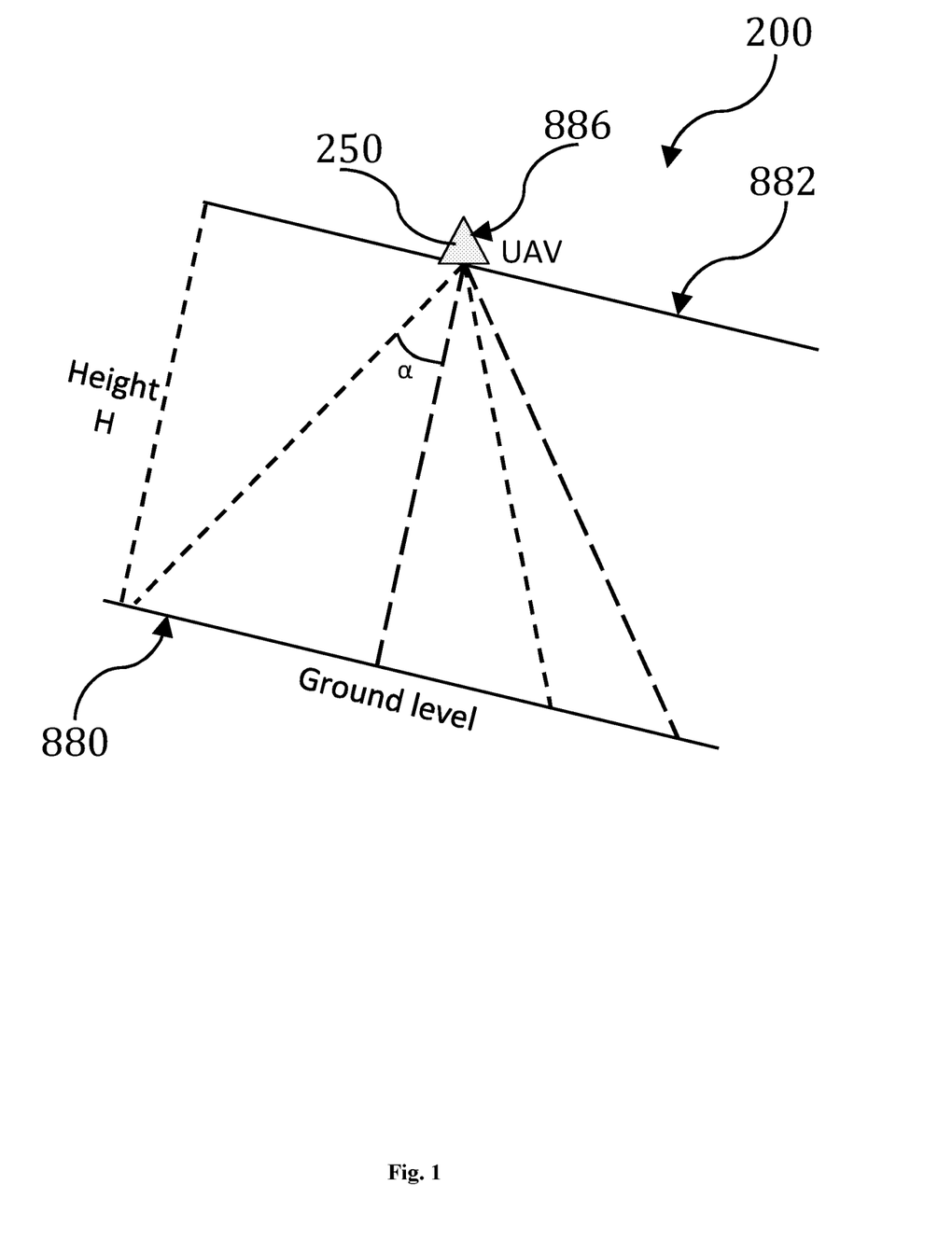
FIG. 1 is an exemplary schematic diagram of a mobile platform.

FIG. 1 illustrates an exemplary schematic diagram of a mobile platform 200. As shown in FIG. 1, the mobile platform 200 can detect a displacement d of the mobile platform 200. An imaging device 886 is shown as installed on the mobile platform 200, such as a UAV 250. When the mobile platform 200 is in the air, as shown in FIG. 1, the imaging device 886 can have a height H and an angle α relative to a ground level 880. The imaging device 886 can comprise a monocular imaging device or a multi-ocular imaging device. In other words, the imaging device 886 can include any suitable number of lenses. In some embodiments, one lens of the imaging device 886 can be used at selected time points for taking a first and second frames 811a, 811b (shown in FIG. 2) of an object of interest. The ground level 880 can be the actual ground, a water level or the ground with any structure. The imaging device 886 can be at a level 882 as illustrated in FIG. 1, which level 882 can have a height H. The mobile platform 200 can have a first angle relative to the ground level 880 and the imaging device 886 can have a second angle relative to a plane of the mobile platform 200. The first and second angles can be combined into an angle α of the imaging device 886 relative to the ground level 880.

In some embodiments, the height H can be acquired with a barometer 251 and/or an ultrasonic device 252 (not shown). The angle α can be acquired with a Simultaneous Localization And Mapping (SLAM) device (not shown) in a manner shown and described below with reference to FIG. 5.

Figure 2:
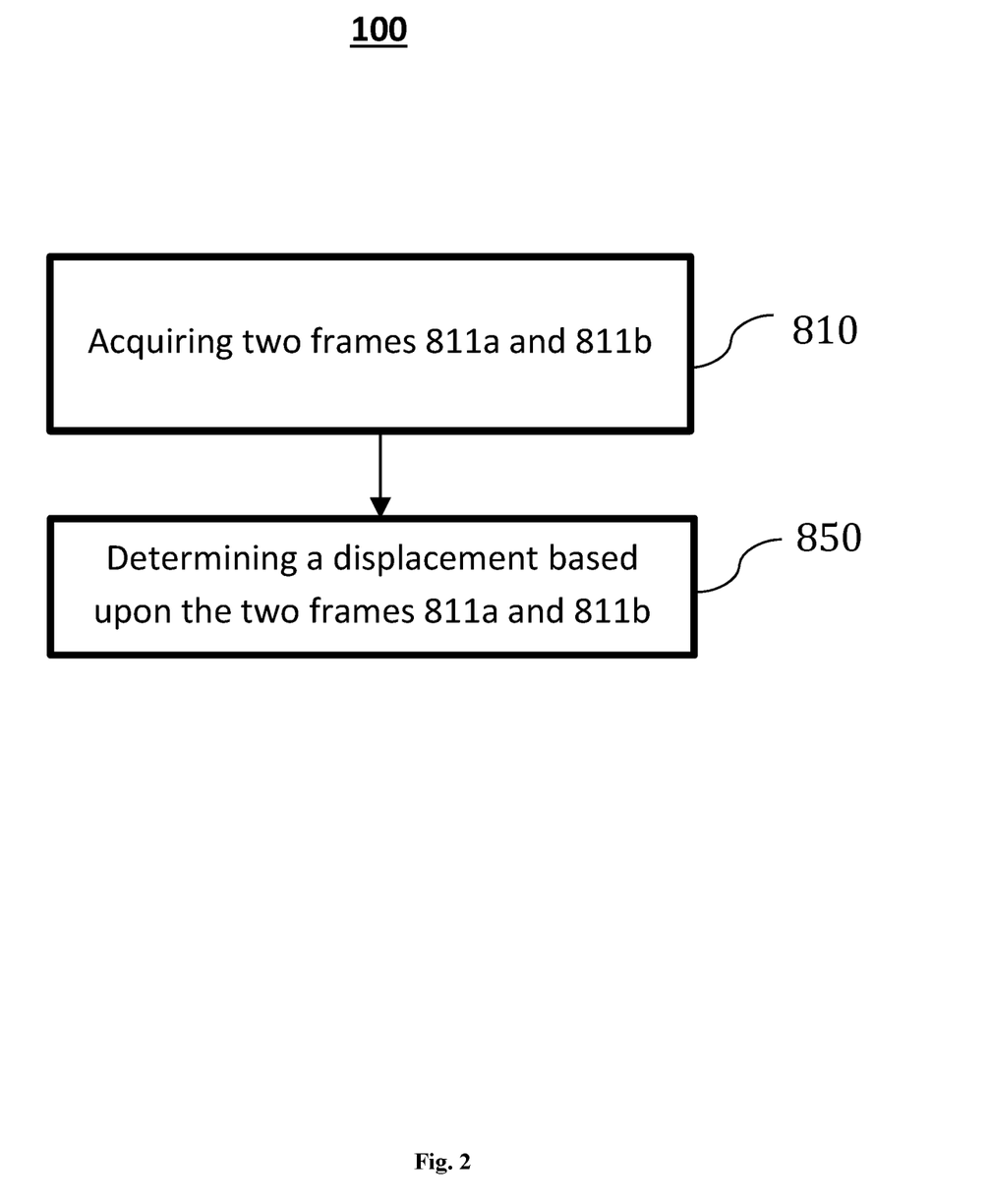
FIG. 2 is an exemplary top-level flowchart of a method for determining a displacement of the mobile platform of FIG. 1.

FIG. 2 illustrates an exemplary embodiment of a method 100 for detecting the displacement d of the mobile platform 200 (collectively shown in FIG. 1). The method 100 of FIG. 2 is shown as including acquiring a first frame 811a and a second frame 811b, at 810. The displacement d of the mobile platform 200 can be determined, at 850, based upon the first and second stereoscopic frames 811a, 811b. In some embodiments, the method 100 can use a monocular imaging system 886 with a SLAM and certain height measurement device, such as a barometer 251 and/or an ultrasonic device 252.

In an exemplary embodiment, the two frames 811a, 811b of images can be acquired at two different time points: a first time point and a second time point with a travel path of the imaging device 886. In some embodiments, the first frame 811a and the second frame 811b can be stereoscopic frames. In some embodiments, the two frames 811a, 811b can have at least an overlapping region with a predetermined percentage of the first frame 811a or the second frame 811b. The overlapping region of the two frames 811a, 811b is defined as points, on the two frames 811a, 811b, reflecting a same object. To ensure such overlapping region, a time span between the first time point and the second time point can be adjusted so that at least one object can be reflected on both frames 811a, 811b. In addition, the imaging device 886 stay still relative to the mobile platform 200 or move slowly in order to ensure the overlapping.

When acquiring the two frames 811a, 811b, the time span between the first time point and the second time point can be less than one-sixtieth of a second and not greater than one-twentieth of a second. The time span can depend on requirements of actual applications or situations. As an exemplary example, when the mobile platform 200 is flying at a lower velocity, the time span can be set to a greater value because an overlapping between the two frames 811a, 811b can be ensured even under the greater time span. On the other hand, when the velocity of the mobile platform 200 is flying at a higher velocity, the time span can be set to a lower value to ensure the overlapping between the two frames 811a, 811b.

At 850, the two frames 811a, 811b can be used to calculate a displacement of a mobile platform 200. Such displacement can be calculated in accordance with the manner shown and described below with reference to FIGS. 3-5.

A system implementing the method 100 can be applicable to a wide height range of one meter to one hundred meters and can be less vulnerable to any ambient interference. In addition, the system does not rely on a Global Positioning System ("GPS") signal, therefore, can be applicable in an environment lack of a GPS signal, such as an indoor setting. The barometer and the monocular imaging device can be easily installed on a mobile platform, for example, can be installed on a small size UAV.

Figure 3:
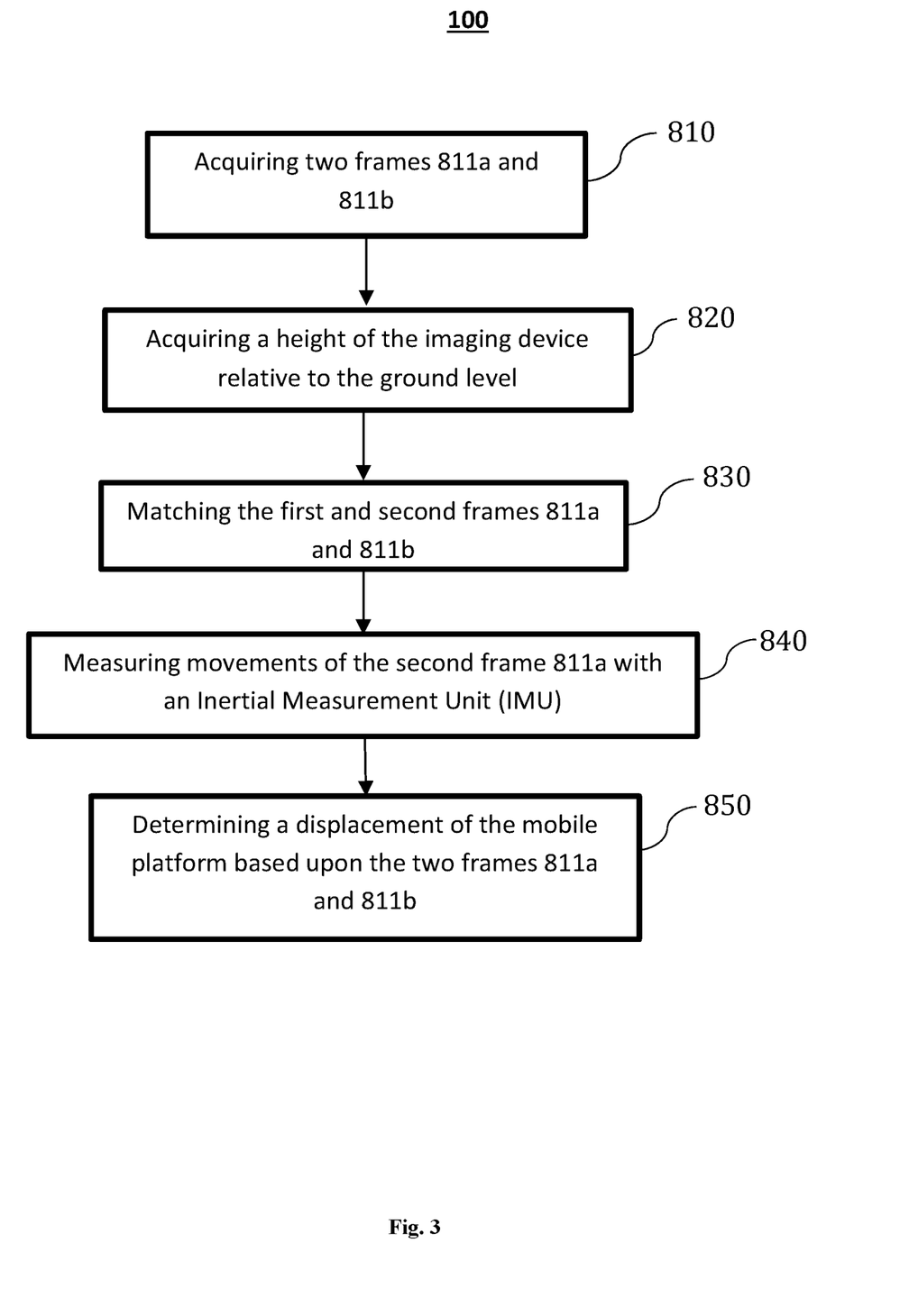
FIG. 3 is an exemplary flowchart of an exemplary embodiment of the method of FIG. 2, wherein pairs of frames are matched.

FIG. 3 illustrates another embodiment of the method 100. In the method 100 of FIG. 3, movement of the mobile platform 200 (shown in FIG. 1) can be calculated. As shown in FIG. 3, after two frames 811a, 811b of an object of interest are acquired, at 810, a height H of a mobile platform 200 can be calculated based on the two frames 811a, 811b, at 820. In some embodiments, the height of the mobile platform 200 can be determined with the barometer 251 and/or the ultrasonic device 252. Although shown and described as acquiring the height H after the two frames 811a, 811b are acquired, the height H of the mobile platform 200 can be acquired before, during or after the first frame 811a and/or the second frame 811b are acquired.

At 830, the second frame 811b can be matched to the first frame 811a by matching feature points 355 (shown in FIG. 6) on the first frame 811a to certain points on second frames 811a, 811b. Under the present disclosure, the two frames 811a, 811b are matched when one or more points, reflecting a same object, on each of the two frames 811a, 811b are found. In other words, the points reflecting the same object define an overlapping region on the two frames 811a, 811b.

The feature points 355 on the first frame 811a can be selected from those points reflecting an outstanding object. Such object can include, for example, a building, a tree, a road, a river or other type structures. In some embodiments, the object can be a stable object or a slowly moving object. Additional detail regarding matching the two frames 811a, 811b is shown and described below with reference to FIG. 4.

At 840, six movements in three translation movements and three rotations of the mobile platform 200 can be measured with an Inertial Measurement Unit ("IMU") and/or estimated with the two stereoscopic frames 811a, 811b. The three translation movements can include translation movements of the mobile platform 200 along each of an x-axis, a y-axis and a z-axis. The three rotations can include rotations of the mobile platform 200 around the x-axis, the y-axis and the z-axis, respectively. The rotations can be acquired in any conventional manner. One conventional manner for acquiring the rotations includes use of the IMU 150. In one embodiment, the translations can be calculated based on the rotation data, which is shown and described below with reference to FIG. 5. Detail regarding calculating the six movements will be provided below with reference to FIG. 5.

The displacement of the mobile platform 200 is determined, at 850. Once acquired, the rotations and the translations, for example, can be applied to calculate the displacement of the mobile platform 200. In some embodiments, a velocity of the mobile platform 200 can be calculated by dividing the translations by the time span for acquiring the two frames 811a, 811b. In another exemplary embodiment, location information of the mobile platform at a time point can be acquired based upon the calculated translation array T and location information of the mobile platform at a time point for acquiring the first frame 811a. The time point can be a time for acquiring the second frame 811b.

In another embodiment, after the displacement is determined, at 850, the next frame of image can be acquired and the system repeats the process in order to calculate the newly acquired frame or frames. The process continues over and over to realize uninterrupted displacement detection.

Figure 4:
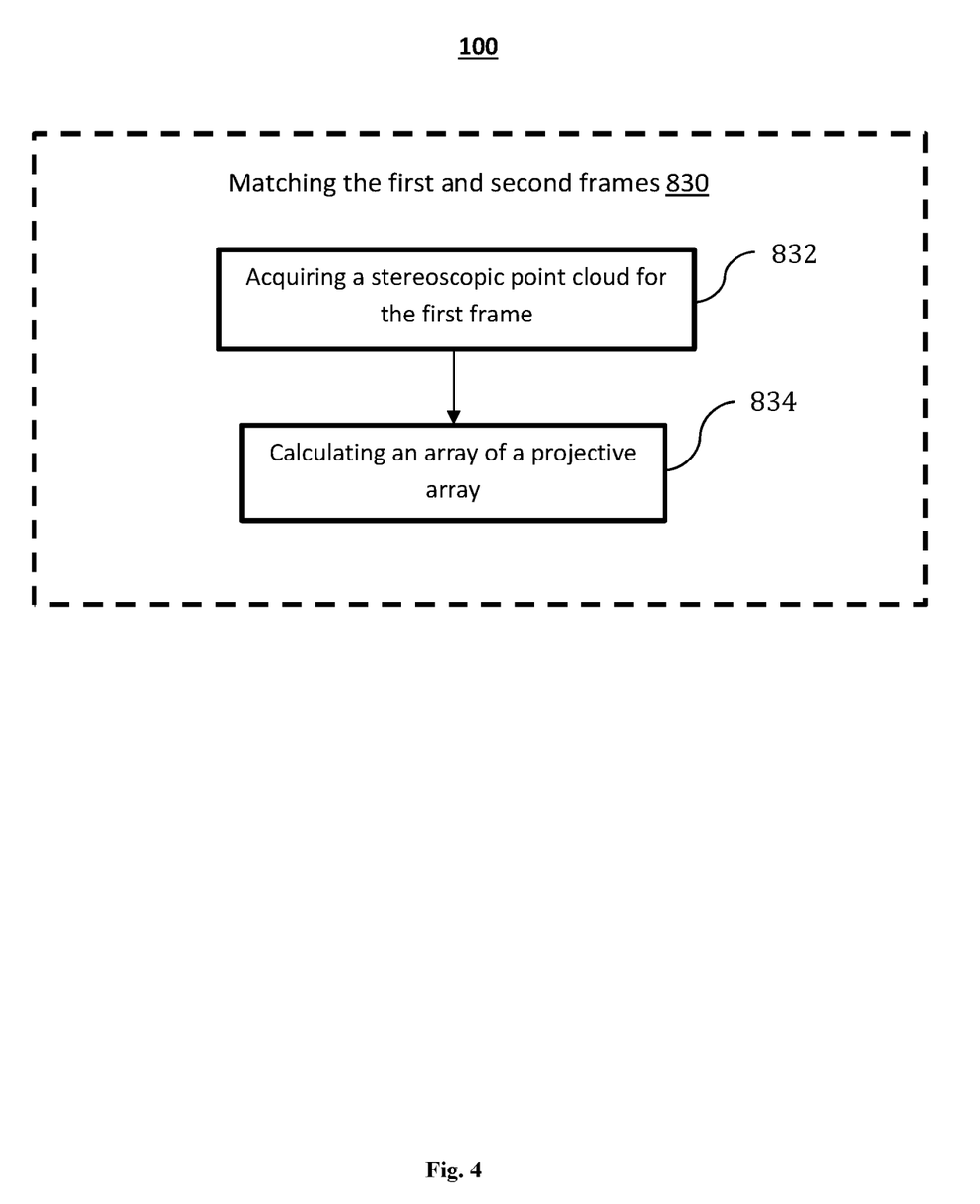
FIG. 4 is another exemplary flowchart of another embodiment of the method of FIG. 3, wherein projective arrays of the frames are calculated.
Figure 5:
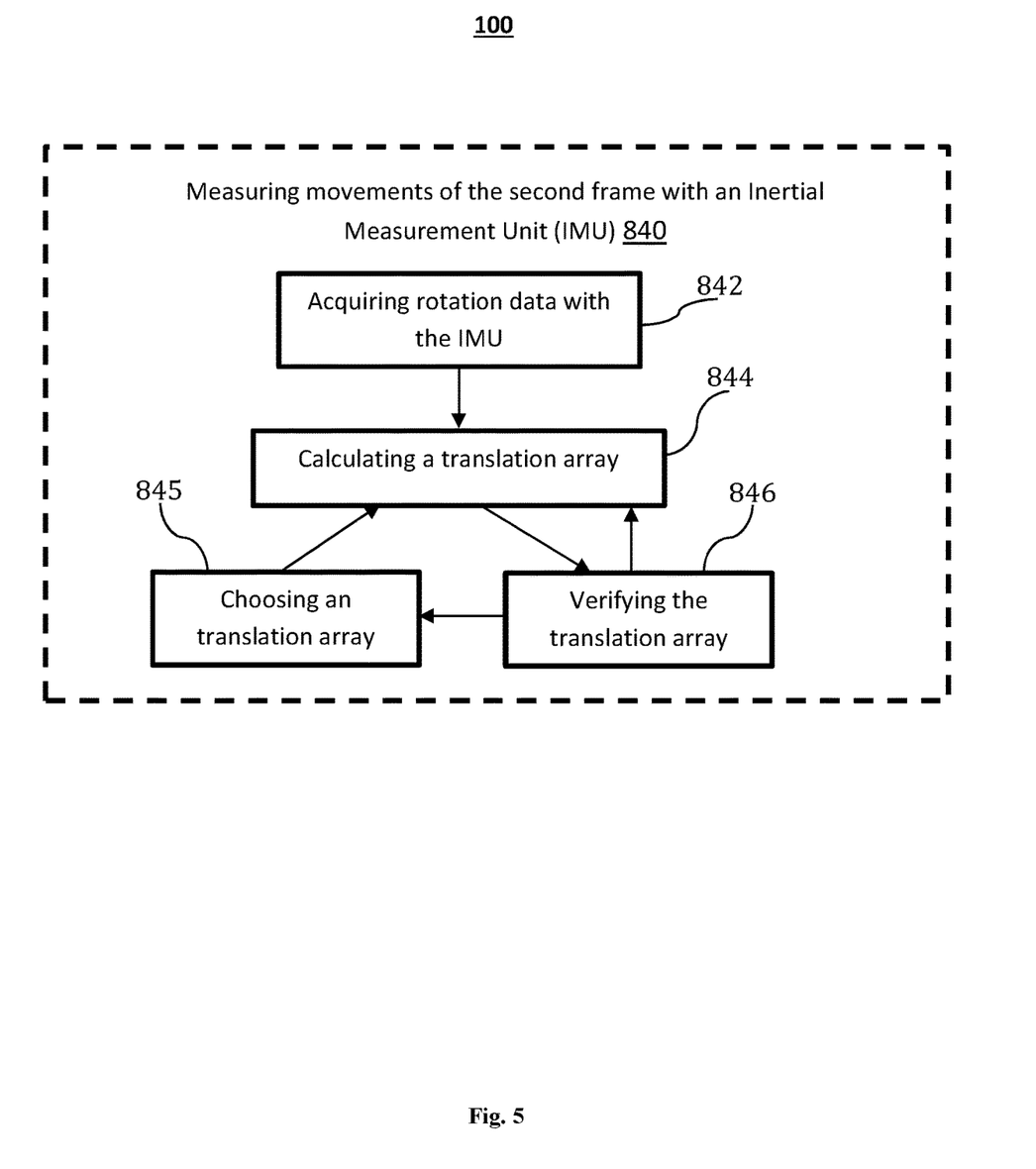
FIG. 5 is another exemplary flowchart of another embodiment of the method of FIG. 3, wherein movements of the second frame are measured.

FIG. 5 illustrates another embodiment of the method 100. Turning to FIG. 5, matching the two frames 811a, 811b is illustrated. As shown in FIG. 5, two frames 811a, 811b can be acquired via any of the methods shown and described with reference to FIG. 1, at 810. FIG. 4 illustrates one exemplary manner by which the method 100 can match, at 830, the second frame 811b with the first frame 811a. Turning to FIG. 4, the frames 811a, 811b consist of multiple points, and each of those points is represented with x, y and z coordinate values. The two frames 811a, 811b described herein can be acquired at different time points along with a travel path of the imaging device 100.

Referring to FIG. 4, a stereoscopic point cloud can be acquired based on the first frame 811a $\{P_1, P_2, P_3, \ldots, P_n\}$, at 832. Each point P is a feature point 355 of the first frame 811a. In an x-y plane, the stereoscopic point cloud can be represented with $\{(x_1^1, y_1^1), (x_2^1, y_2^1), (x_3^1, y_3^1), \ldots, (x_n^1, y_n^1)\}$. The number of the feature points 355 acquired various based on a processing speed, a size of the frame, a resolution of the frame as well as a calculation capacity of a processor (not shown) etc. In a typical embodiment disclosed herein, the number of points, or pixels, can be in an exemplarily range of one hundred to two hundred pixels.

A second projective array can be calculated in the second frame 811b $\{(x_1^2, y_1^2), (x_2^2, y_2^2), (x_3^2, y_3^2), \ldots, (x_m^2, $ $y_m^2$)}, at 834. Each of the points ($x_i^2$, $y_i^2$) of the second projective array represents a matched point, projected in an x-y plane, corresponding to a point $P_j$ or ($x_j^1$, $y_j^1$) of the stereoscopic point cloud of the first frame 811b. A size of the second projective array can be same as a size of the cloud array, in case all points in the cloud array {$P_1, P_2, P_3, \ldots, P_n$} are matched onto the second frame 811b. However, in most cases, the size of the second projective array is less than the size of the cloud array {$P_1, P_2, P_3, \ldots, P_n$} because not all points of the first frame 811a can be matched onto the second frame 811b. Matching of the stereoscopic point cloud of the first frame 811a to the second frame 811b can be accomplished by the method 100 described with reference to FIGS. 6-8, in which three-by-three pixels are compared to determine the similarity of two points.

Now referring back to FIG. 5, an exemplary manner by which the method 100 can measure, at 840, movements of the second frame 811b is illustrated. In FIG. 5, at 842, an IMU 150 (not shown) can be configured to measure rotation measurements that can be passed to a processor (not shown). The rotation measurements can be represented by a three dimensional array R. With the rotation measurement array R, a relationship between the stereoscopic point cloud array of the first frame 811a and the projected point array of the second frame 811b can be represented as:

$$RP_j + T = \mu \begin{pmatrix} x_j \\ y_j \\ 1 \end{pmatrix} \quad \text{Equation (6)}$$

wherein R is a three-dimensional array representing the rotation measurements, Pj is a point of the first frame 811a, T represents a three-dimensional array of translation of the second frame 811b to be calculated and $\mu$ is a random number acting as a factor.

To help ensure an accuracy of the relative rotation array measured by the IMU, the interval between the first time point when the first frame 811a can be taken and the second time point when the second frame 811b can be taken can be relatively short. The time interval between the first frame 811a and the second frame 811b usually can be within a range of twentieth to sixtieth seconds depending on the requirements of actual applications, as described with reference to FIG. 2.

In Equation 6, three unknowns (Tx, Ty, Tz) exist; therefore, by mathematical principles, three equations can be needed to jointly solve the calculated translation array T with the three unknowns, at 844. However, each of the projected points has only two values in $x_i$ and $y_i$. So, in order to resolve three unknowns in the calculated translation array T, three equations out of four equations available for two such points can be joined.

In practical applications, because of errors and/or inaccuracies in matching the points between the first frame 811a and second frame 811b, the calculated translation array T can be inaccurate. At 846, the calculated translation array T can be introduced into the Equation 6, and calculated to determine the number of points that conform to the relationship defined in the equation. Then, another pair of points can be used in solving the calculated translation array T, at 844, which can be then used to calculate to determine the number of points that conform to the relationship of Equation 6 at 846. This process can iterate for a predetermined number of pairs of points, and the results can be a predetermined number of the calculated translation arrays T accompanied with a number of points of conformance to Equation 6 for each translation array.

At 845, the numbers of conformed points can be compared among the calculated translation arrays T. A calculated translation array T with the greatest number of conformed points can be chosen. The process described with reference to FIG. 4 can be repeated again and again to perform continuous displacement detection.

Figure 6:
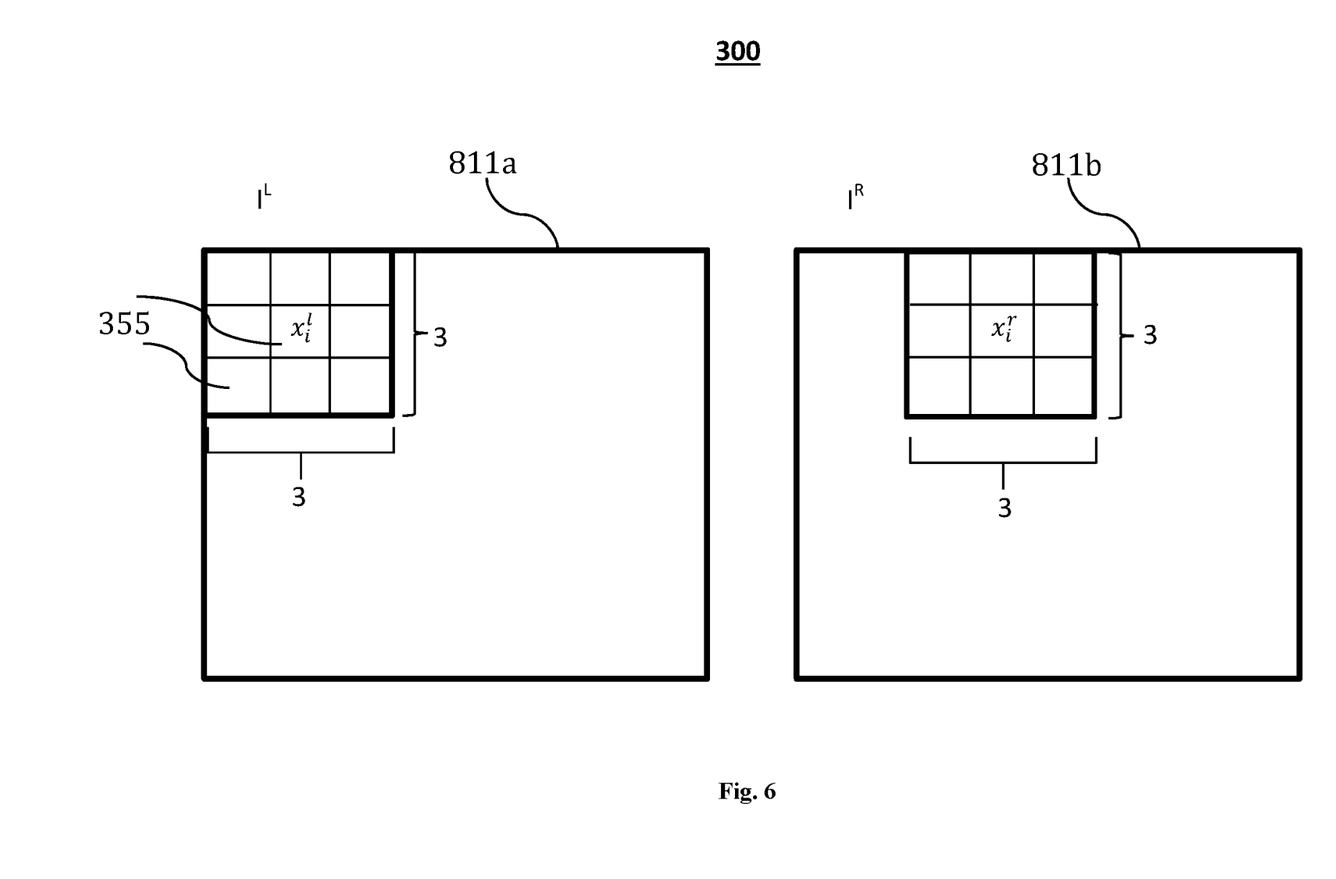
FIG. 6 is an exemplary diagram of another embodiment of the method of FIG. 3, illustrating an exemplary method for matching two images with an overlapping area.

FIG. 6 illustrates an exemplary embodiment of a method 300 for matching a point of the second frame 811b with a corresponding point 355 of the first frame 811a. In FIG. 6, a three-by-three pixel block is taken with the compared point in the center from each of the frames 811a, 811b. When the first and second frames 811a and 811b are color images, values of color components can be compared for each pixel of the three-by-three pixel block. Conversely, when the frames 811a and 811b are black and white images, greyscale values for each pixel can be compared. Based on Equation 5, the point with smallest sum of value differences for all nine pixels can be selected as the matching point. This process can be repeated for all selected feature points on the first frame 811a.

In some embodiments, a method of using Binary Robust Independent Elementary Features ("BRIEF") descriptors can be used for matching the point of the second frame 811b with the corresponding point 355 of the first frame 811a. In an exemplary embodiment, a first binary string, representing a first region around the selected feature point of the first frame 811a, can be built by comparing intensities of each point pairs of the region. The first binary string can be the first BRIEF descriptor of the selected feature point of the first frame 811a.

Similarly, a second binary string representing a second region around the point 355 of the second frame 811b can be built by comparing intensities of each point pairs of the second region. The second binary string can be a second BRIEF descriptor.

A similarity between the selected feature point of the first frame 811a and the point 355 of the second frame 811b can be calculated by comparing a hamming distance between the first BRIEF descriptor and the second BRIEF descriptor. The point 355 of the second frame 811b can be determined as matching the selected feature point of the first frame 811a when a hamming distance between the first BRIEF descriptor and the second BRIEF descriptor is less than a first hamming threshold.

Figure 7:
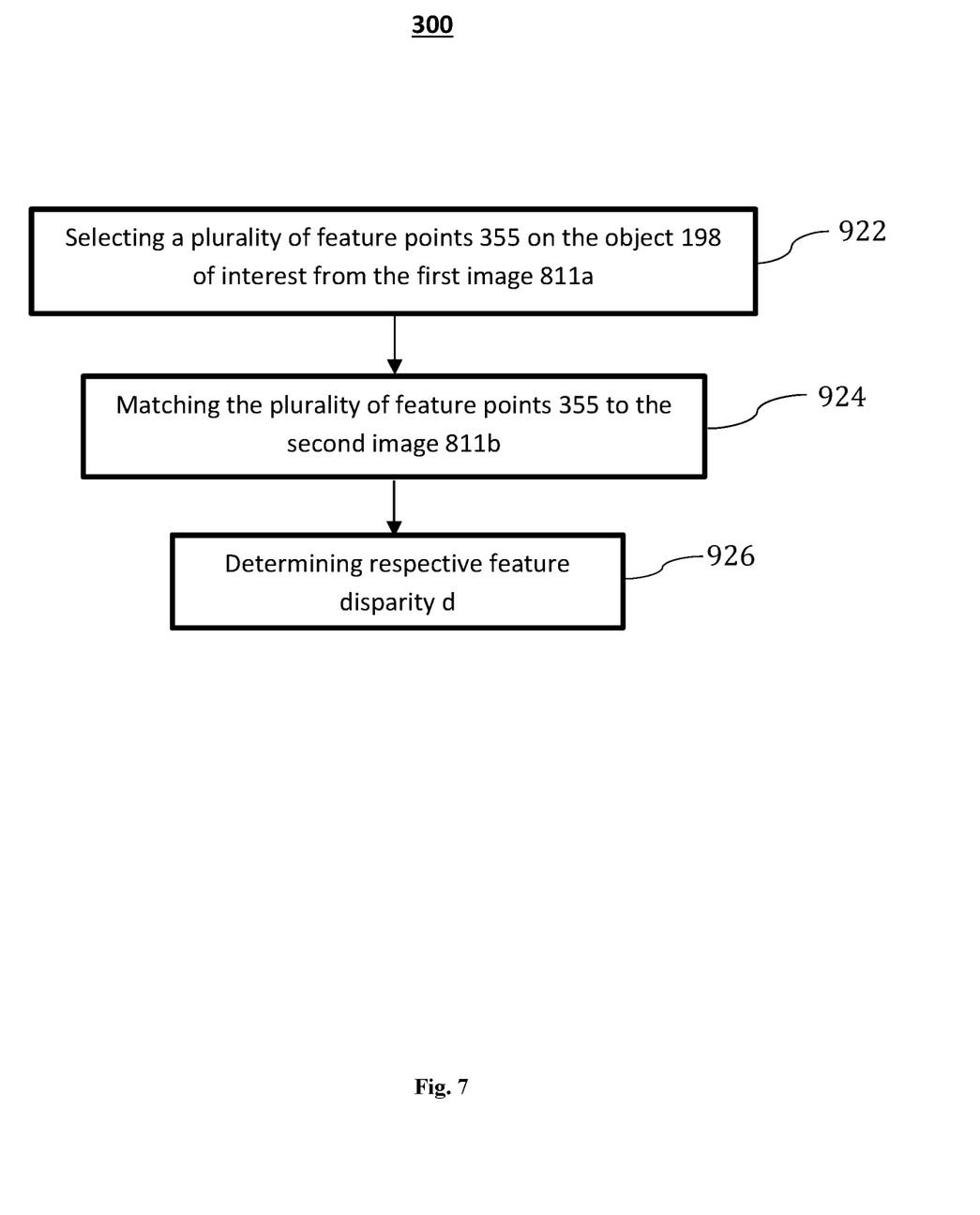
FIG. 7 is an exemplary diagram illustrating another embodiment of the method of FIG. 6, wherein a first frame is matched with a second frame with a plurality of feature points.

Turning now to FIG. 7, an exemplary embodiment of the method 300 for acquiring the disparity d via feature points 355 of the object 198 of interest is illustrated. At 922, a plurality of feature points 355 on the object 198 of interest can be selected. The feature points 355 can be selected using one or more of a variety of different methods. In one exemplary embodiment, the feature points 355 can be identified as pre-defined shapes of the object 198 of interest. In another embodiment, the feature points 355 can be recognized as one or more portions of the object 198 of interest having a particular color or intensity. In another embodiment, the feature points 355 can be selected as random portions of the object 198 of interest. In another embodiment, the feature points 355 can be selected at regularly spaced intervals on the object 198 of interest, for example, every pixel, every other pixel, every third pixel, every fourth pixel, and so forth. The feature points 355 can take varying shapes and sizes, as desired. In some embodiments, a combination of methods described above can be used to select the feature points 355.

Figure 8:
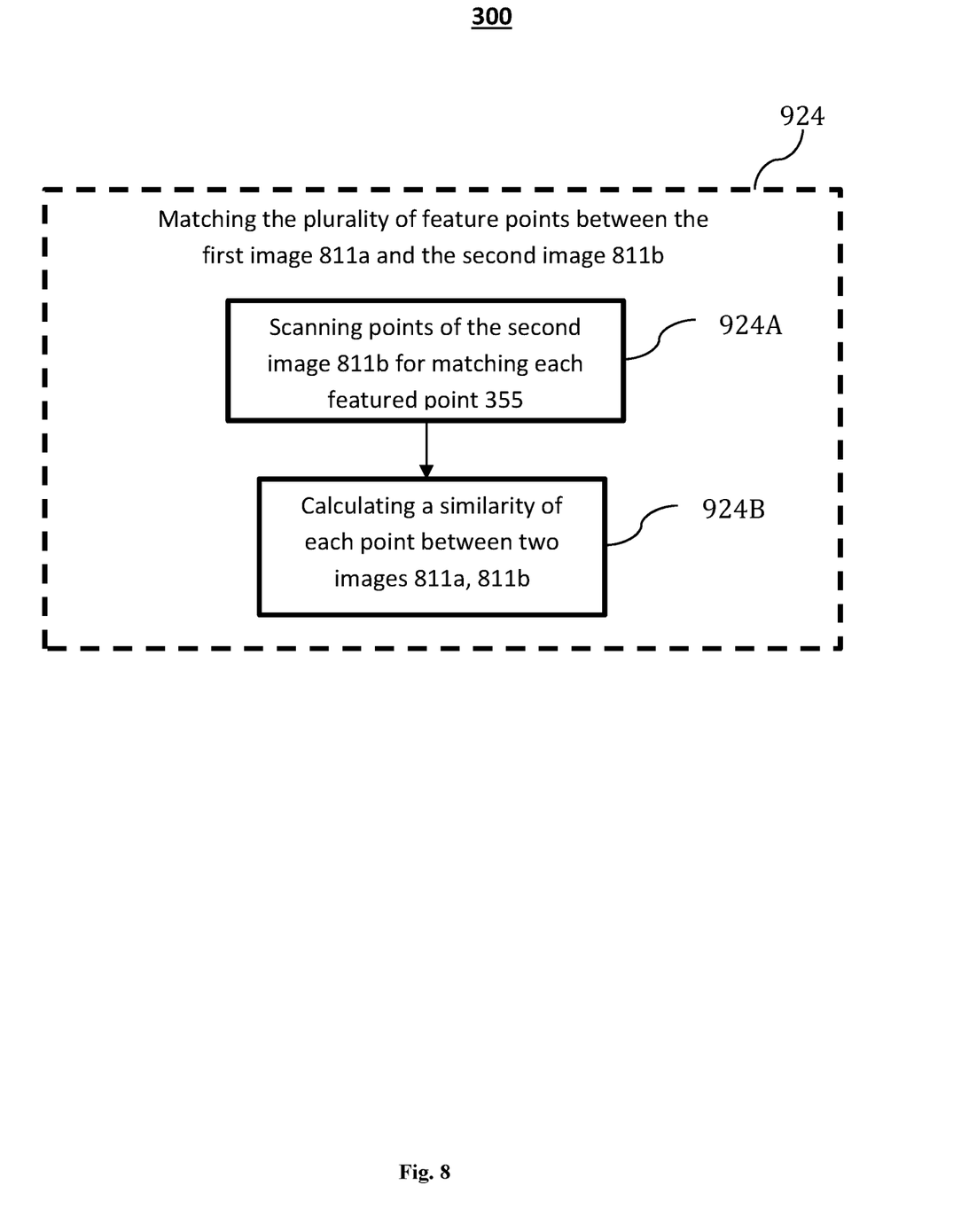
FIG. 8 is an exemplary diagram illustrating another embodiment of the method of FIG. 7, wherein each feature point is matched by calculating a similarity.

At 924, the selected feature points 355 can be matched from the first frame 811a onto the second frame 811b. In some embodiments, matching of the feature points 355 consists of two procedures as shown in FIG. 8. In FIG. 8, at 924A, a feature point 355 of the first frame 811a can selected. A matching point can be scanned starting from a calculated point and along a line parallel to the centered line of a lens (not shown) being used to capture the two frames 811a, 811b. The matching starting point can be calculated based on the coordinates of the point on the first frame 811a. Although in some embodiments limited to only one direction along the selected line, the scanning can be performed in any of one or more predetermined directions.

At 924B, while scanning for each point, a similarity is calculated between two points in the manner shown and described above in detail herein with reference to FIG. 6, and the point 355 of the second frame 811b with the minimum sum of differences with the feature point 355 of the first frame 811a can be selected as a matching point corresponding to the selected feature point 355.

Returning to FIG. 7, a feature disparity d between each feature points 355 of the two frames 811a and 811b can be found, at 926. Any of a variety of methods can be used to determine the disparity d. In one embodiment, the disparity d can be found based on an average of the disparities d for each of the feature points 355. Exemplary types of averages can include an arithmetic mean, a geometric mean, a median, and/or a mode without limitation. In another embodiment, the disparity d can be found by selecting one or more of the feature points 355 and acquiring the disparity d based on the selected feature points 355.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:

1. A method for detecting a displacement of a mobile platform, comprising:
   acquiring a first frame and a second frame using an imaging device that is coupled to the mobile platform;
   obtaining rotation data using an inertial measurement unit (IMU) that is coupled to the mobile platform;
   calculating a translation array based on the first frame, the second frame, and the rotation data; and
   determining the displacement of the mobile platform based on the translation array.

2. The method of claim 1, further comprising:
   obtaining a stereoscopic point cloud based on the first frame, wherein the stereoscopic point cloud is an array of feature points $\{P_1, P_2, P_3, \ldots, P_n\}$, n being a number of the feature points selected in the first frame.

3. The method of claim 2, further comprising:
   projecting the stereoscopic point cloud onto an x-y plane to obtain a first projective array $\{(x_1^1, y_1^1), (x_2^1, y_2^1), (x_3^1, y_3^1), \ldots, (x_n^1, y_n^1)\}$ comprising a plurality of first feature points of the first frame; and
   matching the plurality of first feature points to a plurality of second feature points of the second frame for generating a second projective array $\{(x_1^2, y_1^2), (x_2^2, y_2^2), (x_3^2, y_3^2), \ldots, (x_m^2, y_m^2)\}$ on the x-y plane, m being a number of matched feature points between the first frame and the second frame.

4. The method of claim 3, further comprising:
   calculating the translation array based on a relation between the stereoscopic point cloud, the second projective array, and the rotation data.

5. The method of claim 4, wherein the relation is represented by $$RP_j + T = \mu \begin{pmatrix} x_j^2 \\ y_j^2 \\ 1 \end{pmatrix},$$

wherein R is a rotation array associated the rotation data, Pj is a feature point of the stereoscopic point cloud, T is the translation array to be calculated, $\mu$ is a random number, and $(x_j^2, y_j^2)$ is a matched feature point of the second projective array.

6. The method of claim 3, wherein matching the plurality of feature points between the first frame and the second frame further comprises:
   calculating a similarity for each first feature point of the first frame and each second feature point of the second frame.

7. The method of claim 6, wherein calculating the similarity further comprises:
   comparing first pixel blocks surrounding one of the plurality of first feature points and second pixel blocks surrounding one of the plurality of second feature points using a first binary robust independent elementary features (BRIEF) descriptor and a second BRIEF descriptor to calculate a hamming distance.

8. The method of claim 1, further comprising:
   obtaining a height of the mobile platform relative to a ground level; and
   determining the displacement of the mobile platform further based on the height of the mobile platform.

9. The method of claim 8, wherein the height of the mobile platform is obtained using a barometer or an ultrasonic device.

10. The method of claim 1, further comprising:
    obtaining an angle of the imaging device relative to a ground level; and
    determining the displacement of the mobile platform further based on the angle of the imaging device.

11. The method of claim 10, wherein the angle of the imaging device relative to the ground level is obtained by a simultaneous localization and mapping (SLAM) device.

12. The method of claim 11, wherein obtaining the angle of the imaging device relative to the ground level further comprises:
    obtaining a first angle of the mobile platform relative to the ground level;
    obtaining a second angle of the imaging device relative to a plane of the mobile platform; and
    combining the first angle and the second angle to obtain the angle of the imaging device relative to the ground level.

13. The method of claim 1, wherein the first frame and the second frame are acquired within a time interval, wherein the time interval is no less than one-sixtieth of a second and no greater than one-twentieth of a second.

14. An apparatus for detecting a displacement of a mobile platform, comprising:
    an imaging device coupled to the mobile platform and configured to acquire a first frame and a second frame;

an inertial measurement unit (IMU) coupled to the mobile platform and configured to obtain rotation data; and a processor coupled to the imaging device and the IMU, configured to:

calculate a translation array based on the first frame, the second frame, and the rotation data; and determine the displacement of the mobile platform based on the translation array.

15. The apparatus of claim 14, wherein the processor is further configured to:

obtain a stereoscopic point cloud based on the first frame, wherein the stereoscopic point cloud is an array of feature points $\{P_1, P_2, P_3, \ldots, P_n\}$, n being a number of the feature points selected in the first frame.

16. The apparatus of claim 15, wherein the processor is further configured to:

project the stereoscopic point cloud onto an x-y plane to obtain a first projective array $\{(x_1^1, y_1^1), (x_2^1, y_2^1), (x_3^1, y_3^1), \ldots (x_n^1, y_n^1)\}$ comprising a plurality of first feature points of the first frame; and match the plurality of first feature points to a plurality of second feature points of the second frame for generating a second projective array $\{(x_1^2, y_1^2), (x_2^2, y_2^2), (x_3^2, y_3^2), \ldots, (x_m^2, y_m^2)\}$ on the x-y plane, m being a number of matched feature points between the first frame and the second frame.

17. The apparatus of claim 16, wherein the processor is further configured to:

calculate the translation array based on a relation between the stereoscopic point cloud, the second projective array, and the rotation data.

18. The apparatus of claim 17, wherein the relation is represented by $$RP_j + T = \mu \begin{pmatrix} x_j^2 \\ y_j^2 \\ 1 \end{pmatrix},$$

wherein R is a rotation array associated the rotation data, Pj is a feature point of the stereoscopic point cloud, T is the translation array to be calculated, μ is a random number, and $(x_j^2, y_j^2)$ is a matched feature point of the second projective array.

19. The apparatus of claim 16, wherein when matching the plurality of feature points between the first frame and the second frame, the processor is further configured to:

calculate a similarity for each first feature point of the first frame and each second feature point of the second frame.

20. The method of claim 19, wherein when calculating the similarity, the processor is further configured to:

compare first pixel blocks surrounding one of the plurality of first feature points and second pixel blocks surrounding one of the plurality of second feature points using a first binary robust independent elementary features (BRIEF) descriptor and a second BRIEF descriptor to calculate a hamming distance.

21. The apparatus of claim 14, wherein the processor is further configured to:

obtain a height of the mobile platform relative to a ground level; and determine the displacement of the mobile platform further based on the height of the mobile platform.

22. The apparatus of claim 21, wherein the height of the mobile platform is obtained using a barometer or an ultrasonic device.

23. The apparatus of claim 14, wherein the processor is further configured to:

obtain an angle of the imaging device relative to a ground level; and determine the displacement of the mobile platform further based on the angle of the imaging device.

24. The apparatus of claim 23, wherein the angle of the imaging device relative to the ground level is obtained by a simultaneous localization and mapping (SLAM) device.

25. The apparatus of claim 24, wherein when obtaining the angle of the imaging device relative to the ground level, the processor is further configured to:

obtain a first angle of the mobile platform relative to the ground level;

obtain a second angle of the imaging device relative to a plane of the mobile platform; and combine the first angle and the second angle to obtain the angle of the imaging device relative to the ground level.

26. The apparatus of claim 1, wherein the first frame and the second frame are acquired within a time interval, wherein the time interval is no less than one-sixtieth of a second and no greater than one-twentieth of a second.

* * * * *